United States Patent
Inagaki et al.

(10) Patent No.: US 11,053,374 B2
(45) Date of Patent: Jul. 6, 2021

(54) BASIC MAGNESIUM SULFATE POWDER, METHOD FOR MANUFACTURING BASIC MAGNESIUM SULFATE POWDER, RESIN COMPOSITION CONTAINING BASIC MAGNESIUM SULFATE POWDER, MASTERBATCH PELLET, AND MOLDED BODY

(71) Applicant: Ube Materials Industries, Ltd., Ube (JP)

(72) Inventors: Toru Inagaki, Ube (JP); Kazuki Yoshihara, Ube (JP); Ryoichi Nomura, Ube (JP); Kaoru Takazaki, Ube (JP); Yuzo Kato, Ube (JP)

(73) Assignee: UBE MATERIAL INDUSTRIES, LTD., Yamaguchi (JP)

( * ) Notice: Subject to any disclaimer, the term of this patent is extended or adjusted under 35 U.S.C. 154(b) by 0 days.

(21) Appl. No.: 16/632,987

(22) PCT Filed: Jul. 24, 2019

(86) PCT No.: PCT/JP2019/029103
§ 371 (c)(1),
(2) Date: Jan. 22, 2020

(87) PCT Pub. No.: WO2020/022403
PCT Pub. Date: Jan. 30, 2020

(65) Prior Publication Data
US 2020/0377693 A1    Dec. 3, 2020

(30) Foreign Application Priority Data

Jul. 26, 2018   (JP) .................. 2018-140363

(51) Int. Cl.
*C08K 9/02* (2006.01)
*C08K 3/30* (2006.01)
*C09C 1/02* (2006.01)

(52) U.S. Cl.
CPC .............. *C08K 9/02* (2013.01); *C08K 3/30* (2013.01); *C09C 1/028* (2013.01); *C01P 2004/03* (2013.01); *C01P 2004/04* (2013.01); *C01P 2004/30* (2013.01); *C01P 2004/50* (2013.01); *C01P 2004/54* (2013.01); *C01P 2004/80* (2013.01); *C01P 2006/80* (2013.01); *C08K 2003/3063* (2013.01); *C08K 2201/003* (2013.01); *C08K 2201/004* (2013.01); *C08K 2201/016* (2013.01)

(58) Field of Classification Search
CPC .... C08K 9/02; C08K 3/30; C08K 2003/3063; C08K 3/32; C08K 2003/321–328; C08K 2201/003; C08K 2201/016; C08K 2201/004; C09C 1/028; C09C 1/3653; C01P 2004/80; C01P 2004/03; C01P 2004/54; C01F 5/00; C01F 5/40
USPC .................. 523/200, 417, 418, 423
See application file for complete search history.

(56) References Cited

U.S. PATENT DOCUMENTS

| | | | | |
|---|---|---|---|---|
| 5,262,147 A * | 11/1993 | Miyata | ............ | D01F 9/08 106/419 |
| 8,247,485 B2 * | 8/2012 | Yamamoto | ............ | C08J 3/226 524/423 |
| 8,388,915 B2 * | 3/2013 | Yamamoto | ............ | B01J 20/045 423/158 |
| 9,447,268 B2 * | 9/2016 | Oohori | ............ | C08L 23/12 |
| 2009/0292047 A1 * | 11/2009 | Yamamoto | ............ | C08K 5/0083 524/58 |
| 2011/0275745 A1 * | 11/2011 | Yamamoto | ............ | C08K 5/0083 524/141 |
| 2014/0045982 A1 * | 2/2014 | Nomura | ............ | C08K 7/02 524/423 |
| 2018/0258267 A1 * | 9/2018 | Kim | ............ | C08K 3/346 |

FOREIGN PATENT DOCUMENTS

| | | |
|---|---|---|
| JP | 2007/161954 A | 6/2007 |
| KR | 10-2018-0008377 A | 1/2018 |
| WO | 2013/151188 A1 | 10/2013 |
| WO | 2016/186152 A1 | 11/2016 |

OTHER PUBLICATIONS

Decision to Grant a Patent dated Oct. 23, 2019, issued in counterpart of Japanese Patent Application No. 2019-136375 with English Translation (5 pages).
Office Action dated Mar. 4, 2020, issued in counterpart KR Application No. 10-2020-7002063, with English machine translation. (8 Pages).
Iwanaga, Hiroshi et al., "Growth Mechanism and Properties of Sector-Like Magnesium Hydroxide Sulfate Hydrate", Journal of the Ceramic Society of Japan, 102, 5, 1994, pp. 436-441; Cited in JP Office Action dated Oct. 23, 2019.

* cited by examiner

*Primary Examiner* — Hannah J Pak
(74) *Attorney, Agent, or Firm* — Westerman, Hattori, Daniels & Adrian, LLP

(57) ABSTRACT

A basic magnesium sulfate powder according to the present invention has a surface at least partially coated with an inorganic phosphorus compound. The basic magnesium sulfate powder preferably has a phosphorus content of from 0.001 to 5.0 mass %.

16 Claims, 2 Drawing Sheets

BASIC MAGNESIUM SULFATE POWDER, METHOD FOR MANUFACTURING BASIC MAGNESIUM SULFATE POWDER, RESIN COMPOSITION CONTAINING BASIC MAGNESIUM SULFATE POWDER, MASTERBATCH PELLET, AND MOLDED BODY

TECHNICAL FIELD

The present invention relates to a basic magnesium sulfate powder, a method for manufacturing a basic magnesium sulfate powder, a resin composition containing a basic magnesium sulfate powder, a masterbatch pellet, and a molded body.

BACKGROUND ART

Basic magnesium sulfate, especially fibrous basic magnesium sulfate, is widely used as a filler for polypropylene resin and the like. Basic magnesium sulfate has an effect of reinforcing resin or the like and further has high solubility in body fluids, such as alveolar fluid. Basic magnesium sulfate, if inhaled into the lung, easily dissolves without remaining, and thus basic magnesium sulfate is a filler with high safety although it is fibrous.

However, the use of a resin composition containing fibrous basic magnesium sulfate in an automobile exterior member, such as a bumper, may generate a blister (swelling) on the surface after painting. Since blisters are generated depending on the inherent solubility of fibrous basic magnesium sulfate, a resin composition that is unlikely to generate blisters is proposed by using fibrous basic magnesium sulfate having improved water repellency (e.g., Patent Literature 1).

CITATION LIST

Patent Literature

Patent Literature 1: WO 2016/186152 A

SUMMARY OF INVENTION

Technical Problem

Patent Literature 1 discloses that the surface of fibrous basic magnesium sulfate is coated with both an anionic surfactant and a cationic surfactant. The coating with two surfactants increases water repellency of fibrous basic magnesium sulfate to improve acid resistance. However, the surface coating lowers biosolubility of fibrous basic magnesium sulfate, which is an inherent property of fibrous basic magnesium sulfate. In this case, there is a concern about low biosafety.

An object of the present invention is to provide a basic magnesium sulfate powder that can provide a resin composition that reduces generation of blisters and has the inherent biosolubility of basic magnesium sulfate, and to provide a method for manufacturing the basic magnesium sulfate powder. Another object of the present invention is to provide a resin composition and a masterbatch pellet that suppress generation of blisters and have improved thermal aging resistance, and to provide a molded body having high impact resistance.

Solution to Problem

A basic magnesium sulfate powder according to the present invention has a surface at least partially coated with an inorganic phosphorus compound.

A method for manufacturing a basic magnesium sulfate powder according to the present invention includes wet-mixing basic magnesium sulfate and an inorganic phosphorus compound and next performing filtration, washing, and drying.

A resin composition according to the present invention includes a thermoplastic resin and the basic magnesium sulfate powder in an amount of 1 to 40 mass % of the thermoplastic resin.

A masterbatch pellet according to the present invention includes a thermoplastic resin and the basic magnesium sulfate powder in an amount of 41 to 75 mass % of the thermoplastic resin.

A molded body according to the present invention includes a molded product of the resin composition.

Advantageous Effects of Invention

According to the present invention, provided are: a basic magnesium sulfate powder that has the inherent biosolubility of basic magnesium sulfate and can provide a resin composition that reduces generation of blisters; and a method for manufacturing the basic magnesium sulfate powder. According to the present invention, provided are: a resin composition and a masterbatch pellet that suppress generation of blisters and have improved thermal aging resistance; and a molded body having high impact resistance.

DESCRIPTION OF EMBODIMENTS

Figure 1:
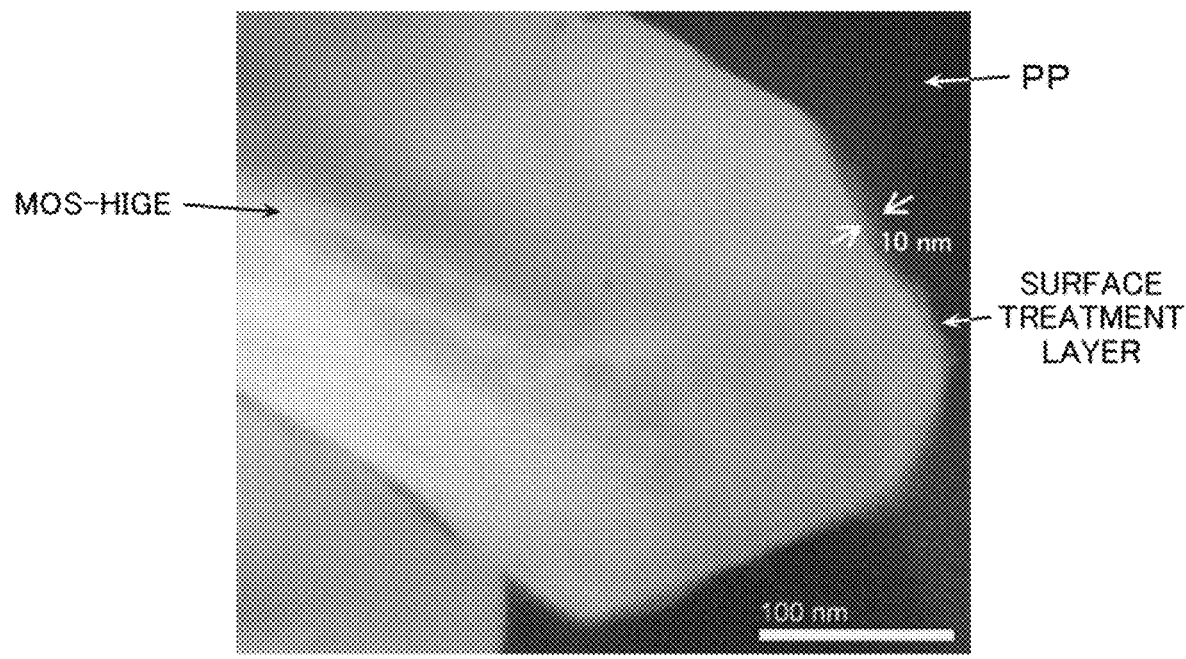
FIG. 1 shows a field emission transmission electron micrograph of the cross section of a basic magnesium sulfate powder according to an embodiment.

The inventors of the present invention have fund that a basic magnesium sulfate powder whose surface is treated with an inorganic phosphorus compound can, when mixed with resin, suppress generation of blisters and improve aging resistance. In addition, the inherent biosolubility of basic magnesium sulfate is maintained, and thus the biosafety is not lowered.

Embodiments of the present invention will be described below.

Basic Magnesium Sulfate

Basic magnesium sulfate is represented by a chemical formula of $MgSO_4 \cdot 5Mg(OH)_2 \cdot 3H_2O$ and can be produced by, for example, hydrothermal synthesis using, as raw materials, magnesium sulfate and an alkaline substance, such as sodium hydroxide, magnesium hydroxide, magnesium oxide, or calcium hydroxide. Basic magnesium sulfate may be either fibrous basic magnesium sulfate or flabellate basic magnesium sulfate as described above, but particularly preferably fibrous basic magnesium sulfate.

The mean fiber length of the fibrous basic magnesium sulfate is normally in the range from 2 to 100 μm, and preferably from 5 to 50 μm, and the mean fiber diameter of the fibrous basic magnesium sulfate is normally in the range from 0.1 to 2.0 μm, and preferably from 0.1 to 1.0 μm. The mean aspect ratio (mean fiber length/mean fiber diameter) of the fibrous basic magnesium sulfate is normally 2 or more, preferably in the range from 3 to 1000, more preferably from 3 to 100, and still more preferably from 5 to 50. The mean fiber length and mean fiber diameter of the fibrous basic magnesium sulfate can be calculated from the number-average values of the fiber length and fiber diameter measured by image analysis from the images magnified with a scanning electron microscope (SEM).

Flabellate basic magnesium sulfate is in the form of particles in which multiple strands of fibrous basic magnesium sulfate are partially joined to each other to form a flabellate shape. Flabellate basic magnesium sulfate has, for example, a mean particle length of from 2 to 100 μm, a mean particle width of from 1 to 40 μm, and a mean aspect ratio of from about 1 to 100. The mean particle length as used herein refers to the dimension of the particles in the longitudinal direction, ant the mean particle width refers to the maximum dimension of the particles in the transverse direction. The longitudinal direction of the particles corresponds to the direction in which the particles have the maximum particle length, and the transverse direction of the particles corresponds to the direction perpendicular to be longitudinal direction. The mean aspect ratio refers to the ratio of (mean particle length/mean particle width).

Each fibrous basic magnesium sulfate forming flabellate basic magnesium sulfate has a mean fiber length of from 2 to 100 μm, a mean fiber diameter of from 0.1 to 5 μm, and a mean aspect ratio of from 1 to 1000. Multiple strands of fibrous basic magnesium sulfate are, for example, bundled at one end and fanned out at the other end. Alternatively, multiple strands of fibrous basic magnesium sulfate may be bundled at a given position in the longitudinal direction and fanned out at the opposite ends. Such flabellate basic magnesium sulfate can be manufactured, for example, in accordance with methods described in JP 4-36092 B, JP 6-99147 B, and the like and identified.

Flabellate basic magnesium sulfate is not necessarily such that each fibrous basic magnesium sulfate is observed, but may be such that strands of fibrous basic magnesium sulfate are partially joined to each other in the longitudinal direction. Fibrous basic magnesium sulfate that is confirmed to have the shape as described above and further have a mean fiber length, a mean fiber diameter, and a mean aspect ratio in predetermined ranges can be regarded as flabellate basic magnesium sulfate used in the present invention.

Inorganic Phosphorus Compound

The surface of the basic magnesium sulfate as described above is at least partially coated with an inorganic phosphorus compound. Examples of the inorganic phosphorus compound include phosphoric acid and phosphates. Specific examples of phosphates include magnesium dihydrogen phosphate, ammonium phosphate, potassium dihydrogen phosphate, calcium dihydrogen phosphate, sodium dihydrogen phosphate, potassium phosphate, trisodium phosphate, ammonium hydrogen phosphate, dipotassium phosphate, ammonium dihydrogen phosphate, tricalcium phosphate, calcium hydrogen phosphate, magnesium hydrogen phosphate, magnesium phosphate, barium hydrogen phosphate, lithium phosphate, and sodium hydrogen phosphate.

The phosphorus content of the basic magnesium sulfate powder whose surface is treated with an inorganic phosphorus compound according to the present invention is preferably from 0.001 to 5.0 mass %, and more preferably from 0.002 to 3.0 mass %. The phosphorus content can be determined by inductively coupled plasma (IPC) atomic emission spectroscopy. When basic magnesium sulfate before treatment contains a small amount of phosphorus, the phosphorus content (X mass %, of basic magnesium sulfate before treatment is measured, and the phosphorus content (Y mass %) of basic magnesium sulfate after the treatment with an inorganic phosphorus compound is measured. The phosphorus content (Y–X mass %) of a sample can be obtained by subtracting X from Y.

Method for Manufacturing Basic Magnesium Sulfate Powder

The basic magnesium sulfate powder according to the present invention can be manufactured by a method including the following steps.

(i) A stop of preparing a slurry containing basic magnesium sulfate (ii) A step of preparing an additive solution containing an inorganic phosphorus compound (iii) A step of coating basic magnesium sulfate with the inorganic phosphorus compound Each step will be described.

(i) Preparation of Slurry

The slurry can be prepared by mixing basic magnesium sulfate and water. The amount of basic magnesium sulfate in the slurry may be, for example, from about 5 to 50 g/L.

(ii) Preparation of Additive Solution

A solvent for the additive solution is not limited but preferably water. The concentration of the inorganic phosphorus compound in the additive solution is appropriately selected according to the type of inorganic phosphorus compound such that she additive solution contains a predetermined amount phosphorous.

(iii) Coating of Basic Magnesium Sulfate with Inorganic Phosphorus Compound

The surface of basic magnesium sulfate is at least partially coated with the inorganic phosphorus compound by wet mixing, filtration, washing, and drying. First, an aqueous solution of the inorganic phosphorus compound is added to the prepared slurry, and the mixture is wet-mixed by performing stirring at room temperature to 80° C. for about 15 minutes to 24 hours. The wet mixing is not necessarily performed by stirring and may be performed by any other method.

The mixture is separated into solid and liquid by filtration such as filtration under reduced pressure. The obtained solid is washed with ion exchange water or the like to form a cake, and the cake was dried in a box-type dryer or the like at 100 to 250° C. for 2 to 48 hours. To suppress generation of dust, the cake may be dried after granulation.

This process provides a basic magnesium sulfate powder according to the present invention having the surface at least partially coated with the inorganic phosphorus compound.

Since an inorganic phosphorus compound having high thermal stability is used, the basic magnesium sulfate powder according to the present invention has desired properties even after dried at a high temperature of about 180° C.

The basic magnesium sulfate according to the present invention having the surface at least partially coated with the inorganic phosphorus compound can, when mixed with resin, suppress generation of blisters because of the inorganic phosphorus compound present on the surface. In addition, the inherent biosolubility of basic magnesium sulfate is not impaired. The solubility of the basic magnesium sulfate powder according to the present invention in artificial alveolar fluid is similar to that of untreated basic magnesium sulfate, and thus the basic magnesium sulfate powder according to the present invention is considered to have high biosafety.

Resin Composition

A resin composition according to the present invention is manufactured by kneading the basic magnesium sulfate powder obtained as described above and a thermoplastic resin. Examples of the thermoplastic resin include a polyethylene resin and a polypropylene resin. The basic magnesium sulfate powder is preferably used in an amount of 1 to 40 mass % of the thermoplastic resin.

The resin composition according to the present invention may contain a fatty acid metal salt as a lubricant. A lubricant increases the Izod strength and flexural modulus of a molded body obtained by molding the resin composition. Examples of the fatty acid metal salt include magnesium stearate, calcium stearate, and aluminum stearate. The amount of the lubricant may be about 0.02 to 1.6 mass % relative to the entire resin composition.

The resin composition according to the present invention may contain other components unless the advantageous effects of the present invention are impaired. Examples of other components include antioxidants, ultraviolet absorbers, pigments, antistatic agents, copper inhibitors, flame retardants, neutralizers, foaming agents, plasticizers, nucleating agents, anti-foaming agents, and crosslinking agents.

The resin composition according to the present invention can be manufactured by mixing a basic magnesium sulfate powder having the surface at least partially coated with an inorganic phosphorus compound, a thermoplastic resin, and as necessary, optional components, and melt kneading these components at 180 to 250° C. in a twin-screw kneader or the like. Since the resin composition according to the present invention contains the basic magnesium sulfate powder according to the present invention having an inorganic phosphorus compound on the surface, it is possible to suppress generation of blisters. Since an inorganic phosphorus compound has high thermal stability, the resin composition has improved thermal aging resistance.

Masterbatch Pellet

A masterbatch pellet according to the present invention contains a thermoplastic resin and the basic magnesium sulfate powder according to the present invention in an amount of 41 to 75 mass % of the thermoplastic resin. The thermoplastic resin may be the foregoing thermoplastic resin. The masterbatch pellet may contain about 0.8 to 3.0 mass % of the foregoing lubricant. For the masterbatch pellet, a resin composition can be prepared by, for example, kneading a polypropylene resin, an elastomer, and other filler, which are provided separately.

Molded Body

A molded body according to the present invention can be manufactured by molding the resin composition according to the present invention. Examples of a molding machine used for molding the resin composition include rolling machines (e.g., calendering machines), vacuum molding machines, extrusion molding machines, injection molding machines, blow molding machines, and press molding machines. Since the resin composition according to the present invention contains a basic magnesium sulfate powder having an inorganic phosphorus compound on the surface as described above, the molded body according to the present invention is unlikely to cause blistering when used especially in an automobile exterior member, such as a bumper.

The basic magnesium sulfate powder according to the present invention having an inorganic phosphorus compound on the surface maintains the inherent properties of basic magnesium sulfate. Therefore, the molded body according to the present invention has an Izod impact strength and a flexural modulus similar to those of a molded body obtained from a resin composition containing untreated basic magnesium sulfate.

EXAMPLES

Specific examples of the present invention will be described below, but these examples do not limit the present invention.

First, an example of using fibrous basic magnesium sulfate ("MOS-HIGE" available from Ube Material Industries, Ltd.) is described. The fibrous basic magnesium sulfate used in this example has a mean fiber length of 13.0 μm, a mean fiber diameter of 0.5 μm, and a mean aspect ratio of 26. A slurry was prepared by mixing 8.0 g of the fibrous basic magnesium sulfate and 400 of ion exchange water. Phosphoric acid was used as an inorganic phosphorus compound. Specifically, an 85% phosphoric acid solution (available from Sigma-Aldrich Japan, guaranteed reagent) was used.

Example 1

An additive solution (400 ml) was prepared by diluting 0.0041 g of 85% phosphoric acid solution with ion exchange water at room temperature. The obtained additive solution was added to the foregoing slurry as described above. The mixture was stirred at room temperature for 4 hours to treat the surface of the fibrous basic magnesium sulfate.

After the surface treatment, the slurry was filtered under reduced pressure to remove the liquid. The obtained solid was washed with 50 times as much ion exchange water as the solid to provide a cake. The cake was granulated through an about-2-mm mesh screen and then dried in a box-type dryer at 120° C. for 24 hours to produce a sample (fibrous basic magnesium sulfate powder) of Example 1.

Example 2

A sample of Example 2 was produced in the same manner in Example 1 except that the amount of 8.5% phosphoric acid solution used was changed to 0.020 g.

Example 3-1

A sample of Example 3-1 was produced in the same manner as in Example 1 except that the amount of 85% phosphoric acid solution used was changed to 0.041 g.

Example 3-2

A sample of Example 3-2 was produced in the same manner as in Example 3-1 except that the drying temperature was changed to 180° C.

Example 4

A sample of Example 4 was produced in the same manner as in Example 1 except that the amount of 85% phosphoric acid solution used was changed to 0.104 g.

Example 5

A sample of Example 5 was produced in the same manner as in Example 1 except that the amount of 85% phosphoric acid solution used was changed to 0.198 g.

Example 6

A sample of Example 6 was produced in the same manner as in Example 1 except that the amount of 85% phosphoric acid changed to 0.621 g.

Example 7

An additive solution was prepared by dissolving 0.008 g magnesium dihydrogen phosphate (available from Sigma-Aldrich Japan, guaranteed reagent), which was an inorganic phosphorus compound, in 400 ml ion exchange water at room temperature.

A sample of Example 7 was produced in the same manner as in Example 1 except that the additive solution thus obtained was used.

Example 8

A sample of Example 8 was produced in the same manner as in Example 7 except that the amount of magnesium dihydrogen phosphate used was changed to 0.08 g.

Example 9

A sample of Example 9 was produced in the same manner as in Example 7 except that the amount of magnesium dihydrogen Phosphate used was changed to 0.8 g.

Example 10

A sample of Example 10 was produced in the same manner as in Example 7 except that 0.0728 g ammonium phosphate trihydrate (95.0%, available from Junsei Chemical Co., Ltd.,) was used as an inorganic phosphorus compound.

Example 11

A sample of Example 11 was produced the same manner as in Example 7 except that 0.048 g potassium phosphate (available from Junsei Chemical Co., Ltd., guaranteed reagent) was used as an inorganic phosphorus compound.

Example 12

A sample of Example 12 was produced in the same manner as in Example 7 except that 0.056 g sodium dihydrogen phosphate dihydrate (available from Wako Pure Chemical Industries, Ltd., guaranteed reagent) was used as an inorganic phosphorus compound.

Example 13

A sample of Example 13 was produced in the manner as in Example 7 except that 0.130 g disodium hydrogen phosphate 12-water (available from Junsei Chemical Co., Ltd., guaranteed reagent) was used as at inorganic phosphorus compound.

Comparative Example 1

Untreated fibrous basic magnesium sulfate was used as a sample of Comparative Example 1.

Comparative Example 2

A slurry was prepared by mixing 5.4 g fibrous basic magnesium sulfate ("MOS-HIGE" available from Ube Material Industries, Ltd., mean fiber length 13.0 μm, mean fiber diameter 0.5 μm, mean aspect ratio 26) and 700 ml ion exchange water.

An additive solution (A) of an anionic surfactant was prepared by dissolving 0.440 g phosphate ("JP-518S" available from Johoku Chemical Co., Ltd.), which was an organic phosphorus compound, and 6.6 ml 0.2N NaOH (available from Sigma-Aldrich Japan) in 50 ml ion exchange water at 80° C.

An additive solution (B) of a cat one surfactant was prepared by dissolving 0.114 g tetradicylamine "Cation-MA" available from NOF CORPORATION) in 50 ml ion exchange water at 80° C.

The additive solution (A) was added to the foregoing slurry and stirred at 80° C. for 20 minutes. Subsequently, the additive solution (B) was further added and stirred at 80° C. for 20 minutes to treat the surface of fibrous basic magnesium sulfate.

After the surface treatment, a sample of Comparative Example 2 was produced by the same procedure as in Example 1.

Comparative Example 3

The amount of phosphate used was changed to 0.146 g, the amount of 0.2N NaOH used was changed to 2.2 ml, and the amount of tetradicylamine used was changed to 0.056 g. Otherwise, a sample of Comparative Example 3 was produced in the same manner as in Comparative Example 2.

Comparative Example 4-1

The additive solution was only the additive solution (A). The additive solution (A) was added to the slurry and stirred at 80° C. for 20 minutes to treat the surface of fibrous basic magnesium sulfate. Otherwise, a sample of Comparative Example 4-1 was produced by the same procedure as in Comparative Example 2.

Comparative Example 4-2

A sample of Comparative Example 4-2 was produced in the same manner as in Comparative Example 4-1 except that the drying temperature was changed to 180° C.

Comparative Example 5-1

A sample of Comparative Example 5-1 was produced in the same manner as in Comparative Example 4-1 except that the amount of phosphate used was changed to 0.440 g and the amount of 0.2N NaOH used was changed to 6.6 ml.

Comparative Example 5-2

A sample, of Comparative Example 5-2 was produced in the same manner as in Comparative Example 5-1 except that the drying temperature was changed to 180° C.

Evaluation of Fibrous Basic Magnesium Sulfate Powder

The samples of Examples and Comparative Examples were examined for phosphorus content and solubility. The methods are described below.

Analysis of Phosphorus Content

The phosphorus content of each sample was determined by ICP atomic emission spectroscopy.

Solubility Test in Water

For an untreated basic magnesium sulfate powder and a basic magnesium sulfate powder whose surface was treated with an inorganic phosphorus compound, 1.00 g of a sample was then added to 400 ml ion exchange water at 80° C., and the mixture was stirred at 500 rpm to prepare a slurry. After 24 hours, the slurry was filtered to collect the filtrate. For the basic magnesium sulfate powder whose surface was treated with an organic phosphorus compound, 20 ml ethanol at 32° C. was added to 1.00 g of the sample in the pretreatment to improve dispersibility in water, and the obtained dispersion was added to 400 ml ion exchange water at 80° C. The mixture was stirred at 500 rpm for 24 hours to provide a slurry, and the slurry was filtered to collect the filtrate.

The Mg content and S content of the filtrate were determined by ICP atomic emission spectroscopy. The amount of dissolved $MgSO_4$ was calculated from the molar concentration of S, and the amount of dissolved $Mg(OH)_2$ was calculated from a difference between the molar concentration of Mg and the molar concentration of S of the filtrate. The sum of the amount of dissolved $MgSO_4$ and the amount of dissolved $Mg(OH)_2$ was converted into mass, and the mass was defined as the amount (A) of dissolved basic magnesium sulfate.

The solubility was calculated from the amount (A) of dissolution in accordance with the following formula.

Solubility (mass %) in water=($A$)/1.00×100

Solubility Test in Artificial Alveolar Fluid

The solubility in artificial alveolar fluid at 37° C. was evaluated as an indication of biosafety. To prepare artificial alveolar fluid, 0.212 g magnesium chloride hexahydrate, 6.415 g sodium chloride, 0.255 g calcium chloride, 0.079 g sodium sulfate, 0.148 g disodium hydrogen phosphate, 2.703 g sodium hydrogen carbonate, 0.180 g sodium tartrate dihydrate, 0.153 g sodium citrate, 0.175 g sodium lactate, 0.118 g glycine, and 0.172 g sodium pyruvate were sequentially dissolved in 1 L ion exchange water. Next, 6 N hydrochloric acid was added to control the pH at 7.6±0.2. To this mixture, 1.0 cc/L formaldehyde was added as a preservative. The obtained solution was used as artificial alveolar fluid.

Each sample (1.00 g) was added to 500 ml artificial alveolar fluid, and the mixture was maintained at 37° C. and left to stand. After the mixture was left to stand for 4 days, the supernatant was filtered through 5C filter paper, and the filtrate was used as an analytical sample. The mg content and S content of the analytical sample were determined by ICP atomic emission spectroscopy, and the amount (B) of basic magnesium sulfate dissolved in the artificial alveolar fluid was calculated by the same method as in the solubility test in water.

The solubility was calculated from the amount (B) of dissolution in accordance with the following formula.

Solubility (mass %) in artificial alveolar fluid=($B$)/1.00×100

Production of Molded Body

A resin composition was prepared by adding each sample to a thermoplastic resin, and a molded body was produced using the obtained resin composition. The resin composition was prepared by melt-kneading the following components in Labo Plastomill (available from Toyo Seiki Seisaku-sho, Ltd.) at about 180° C. for 4 minutes.

Sample 10 parts by mass
Polypropylene 90 parts by mass
Lubricant (magnesium stearate) 0.3 parts by mass
Antioxidant 0.1 parts by mass The obtained resin composition was molded into a molded body (50 mm long, 5 mm wide, 2 mm thick) for evaluating resin physical properties and a molded body (40 mm long, 40 mm wide, 1 mm thick) for coating at 230° C. by using an injection molding machine ("Handy Try" available from Shinko Sellbic Co., Ltd.).

Evaluation of Molded Body

The Izod impact strength and the flexural modulus were measured by using the obtained molded body for evaluating resin physical properties as a test piece. The Izod impact strength was measured in accordance with JIS K7110, and the flexural modulus was measured in accordance with JIS K7171.

Production of Coated Test Piece

One surface of the molded body for coating was coated with a primer ("Pita king 602ECO" available from Solar Co., Ltd.), a base coat ("Admila α" available from Nippon Paint Co., Ltd.), and a clear coat ("Hi-Po Clear" available from Nippon Paint Co., Ltd.) in this order to provide a coated test piece.

Blister Test

The coated test piece was immersed in ion exchange water at 40° C. and left to stand for 10 days. After immersion, the test piece was dried and observed with an optical microscope to determine whether blisters were generated on the surface. The number of blisters having a diameter of 0.2 mm or more was counted in a field of view of 3.0 cm² (3 cm×1 cm), and the blister suppressing effect was evaluated on the basis of the following criteria.

Less than 10 blisters: ○
10 or more blisters and less than 50 blisters: Δ
50 or more blisters: ×

Table 1 below summarizes the evaluation results and the blister suppressing effect for each sample. Table 2 below summarizes the drying temperature, the evaluation results of the molded body, and the blister suppressing effect for each sample.

TABLE 1

|  | Phosphorus content (mass %) | Solubility in water (mass %) | Solubility in artificial alveolar fluid (mass %) | Blister suppressing effect |
|---|---|---|---|---|
| Comparative Example 1 | 0.000 | 13.5 | 15.3 | × |
| Example 1 | 0.003 | 3.0 | 16.0 | Δ |
| Example 2 | 0.033 | 2.8 | 14.6 | ○ |
| Example 3-1 | 0.048 | 3.3 | 12.5 | ○ |
| Example 4 | 0.091 | 2.7 | 14.7 | ○ |
| Example 5 | 0.631 | 3.2 | 14.9 | Δ |
| Example 6 | 1.981 | 3.4 | 16.2 | Δ |
| Example 7 | 0.010 | 2.3 | 13.4 | ○ |
| Example 8 | 0.231 | 2.4 | 17.8 | ○ |
| Example 9 | 2.581 | 2.7 | 17.3 | ○ |
| Example 10 | 0.081 | 3.2 | 16.3 | ○ |
| Example 11 | 0.066 | 3.4 | 17.7 | ○ |
| Example 12 | 0.036 | 3.4 | 17.9 | ○ |
| Example 13 | 0.033 | 3.2 | 17.8 | ○ |
| Comparative Example 2 | 0.471 | 0.8 | 1.8 | ○ |
| Comparative Example 3 | 0.161 | 4.0 | 2.5 | ○ |
| Comparative Example 4-1 | 0.161 | 4.2 | 3.2 | ○ |
| Comparative Example 5-1 | 0.381 | 1.8 | 0.40 | ○ |

The fibrous basic magnesium sulfate powders of Examples coated with an inorganic phosphorus compound contain 0.001 to 5.0 mass phosphorus. These powders have lower solubility in water than the untreated powder (Comparative Example 1) but have similar solubility in artificial alveolar fluid to the untreated powder of Comparative Example 1.

A powder (e.g., Comparative Example 2) when treated with an organic phosphorus compound is shown to have low solubility in artificial alveolar fluid.

TABLE 2

|  | Drying temperature (° C.) | Izod impact strength (KJ/m²) | Flexural modulus (GPa) | Blister suppressing effect |
|---|---|---|---|---|
| Comparative Example 1 |  | 4.5 | 3.1 | × |
| Example 3-1 | 190 | 4.4 | 2.9 | ○ |
| Example 3-2 | 180 | 4.6 | 3.1 | ○ |
| Comparative Example 4-1 | 120 | 4.9 | 3.1 | ○ |
| Comparative Example 4-2 | 180 | 4.2 | 3.1 | ○ |
| Comparative Example 5-1 | 120 | 4.9 | 2.9 | ○ |
| Comparative Example 5-2 | 180 | 3.4 | 3.0 | ○ |

As shown in Table 2 above, generation of blisters is suppressed in molded bodies of Examples. The molded bodies of Examples have an Izod impact strength and a flexural modulus similar to those of molded bodies produced by using untreated fibrous basic magnesium sulfate. The Izod impact strength of the molded bodies of Comparative Examples coated with an organic phosphorus compound decreases when the molded bodies of Comparative Examples are dried at a high temperature (180° C.) However, the Izod impact strength of the molded body of Example coated with an inorganic phosphorus compound does not decrease even when the molded body of Example is dried at a high temperature. This may be because an inorganic phosphorus compound having no organic group has high thermal stability and the resin composition thus has improved thermal aging resistance.

Observation of Surface Treatment Layer

The molded body for evaluating resin physical properties of Example 3-1 was embedded in photocurable acrylic resin, followed by trimming and surfacing. The resin-embedded molded boy was then processed into an ultrathin section by using a cryomicrotome ("FCS" available from Leica Camera AG) to provide an observation sample.

The cross section of the sample was observed by using scanning transmission electron microscopy (STEM) ("JEM-2100F" available from JEOL Ltd.). The result is shown in FIG. 1. The surface treatment layer having a thickness of about 10 nm was observed in the surface of the fibrous basic magnesium sulfate sample of Example 3-1.

A phosphorus component in the surface treatment layer was detected by qualitative analysis on the surface treatment layer using energy dispersive X-ray spectroscopy (EDS) (UTW-type Si (Li) semiconductor detector available from JEOL Ltd.).

Figure 2:
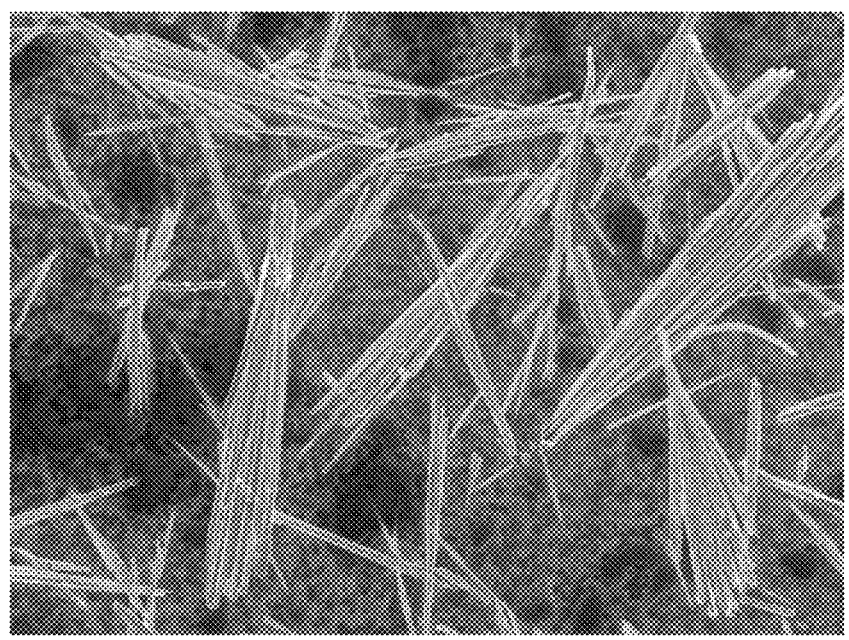
FIG. 2 shows a scanning electron micrograph of untreated flabellate basic magnesium sulfate.

Next, an example of using flabellate basic magnesium sulfate is described. The flabellate basic magnesium sulfate used herein is in the shape of sector (mean particle length 33.0 μm, mean particle width 6.0 μm, mean aspect ratio 5.5) in which multiple strands of fibrous basic magnesium sulfate are bundled. Strands of fibrous basic magnesium sulfate have a mean fiber length of 33.0 μm, a mean fiber diameter of 1.3 μm, and a mean aspect ratio of 26. FIG. 2 shows the scanning electron micrograph of the flabellate basic magnesium sulfate.

A slurry was prepared by mixing 8.0 g of the flabellate basic magnesium sulfate and 400 mL of ion exchange water. Phosphoric acid was used as an inorganic phosphorus compound. Specifically, an 85% phosphoric acid solution (available from Sigma-Aldrich Japan, guaranteed reagent) was used.

Example 14

An additive solution (40 mL) was prepared by diluting 0.041 g of 85% phosphoric acid solution with ion exchange water at room temperature. The obtained additive solution was added to the foregoing slurry as described above. The mixture was stirred at 60° C. for 4 hours to treat the surface of flabellate basic magnesium sulfate.

After the surface treatment, the slurry was filtered under reduced pressure to remove the liquid. The obtained solid was washed with 50 times as much ion exchange water as the solid to provide a cake, and the cake was dried in a box type dryer at 180° C. for 24 hours to produce a sample (flabellate basic magnesium sulfate powder) of Example 14.

Example 15

A sample of Example 15 was produced in the same manner as in Example 14 except that the amount of 85% phosphoric. acid solution used was changed to 0.104 g.

Example 16

Figure 3:
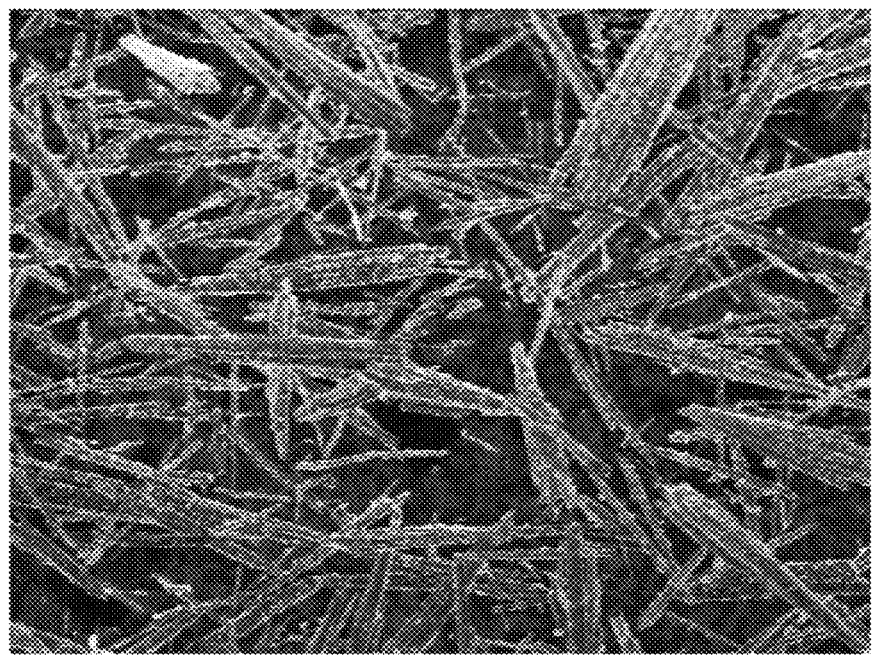
FIG. 3 shows a scanning electron micrograph of a basic magnesium sulfate powder according to another embodiment.

A sample of Example 16 was produced in the same manner as in Example 14 except that the amount of 85% phosphoric acid solution used was changed to 0.205 g. The scanning electron micrograph of the sample of Example 16 is shown in FIG. 3. As compared with FIG. 2, FIG. 3 indicates that the inorganic phosphorus compound covers the surface of basic magnesium sulfate.

Comparative Example 6

Untreated flabellate basic magnesium sulfate was used as a sample of Comparative Example 6.

Evaluation of Flabellate Basic Magnesium Sulfate Powder

The samples of Examples and Comparative Examples were examined for phosphorus content, solubility in water, and solubility in artificial alveolar fluid by the same, methods as described above.

Production of Molded Body and Evaluation

A molded body was produced by the same method as described above using each sample. The Izod impact strength and the flexural modulus were measured by the same methods as described above using the obtained molded body as a test piece.

Production of Coated Test Piece and Evaluation of Blister Suppressing Effect

A coated test piece was produced by the same method as described above and subjected to the same blister test as described above to evaluate the blister suppressing effect.

Table 3 below summarizes the evaluation results for each sample. Table 4 below summarizes the drying temperature, the evaluation results of the molded body, and the blister suppressing effect for each sample.

TABLE 3

|  | Phosphorus content (mass %) | Solubility in water (mass %) | Solubility in artificial alveolar fluid (mass %) |
|---|---|---|---|
| Example 14 | 0.11 | 2.0 | 19.3 |
| Example 15 | 0.29 | 1.8 | 16.3 |
| Example 16 | 0.75 | 1.3 | 15.7 |
| Comparative Example 6 | <0.001 | 46 | 15.6 |

The flabellate basic magnesium sulfate powders of Examples 14 to 16 coated with an inorganic phosphorus compound contain 0.11 to 0.75 mass % phosphorus. These powders have lower solubility in water than the untreated powder (Comparative Example 6) but have larger solubility in artificial alveolar fluid than the untreated powder of Comparative Example 6.

TABLE 4

|  | Drying temperature (° C.) | Izod impact strength (KJ/m$^2$) | Flexural modulus (GPa) | Blister suppressing effect |
|---|---|---|---|---|
| Example 14 | 180 | 4.1 | 2.6 | ○ |
| Example 15 | 180 | 4.7 | 2.6 | ○ |
| Example 16 | 180 | 3.6 | 2.6 | ○ |
| Comparative Example 6 |  | 4.9 | 3.0 | × |

As shown in Table 4 above, 50 or more blisters are generated in the molded body of Comparative Example 6 produced by using untreated flabellate basic magnesium sulfate, but generation of blisters is suppressed in the molded bodies of Examples 14 to 16. This indicates that the use of the resin composition containing flabellate basic magnesium sulfate coated with an inorganic phosphorus compound provides a molded body that is unlikely to cause blistering. In addition, the molded bodies of Examples have an Izod impact strength and a flexural modulus similar to those of the molded body of Comparative Example 6 produced by using untreated flabellate basic magnesium sulfate.

The invention claimed is:

1. A basic magnesium sulfate powder comprising a surface at least partially coated with an inorganic phosphorus compound, wherein the basic magnesium sulfate is flabellate basic magnesium sulfate, wherein the flabellate basic magnesium sulfate is in a form of particles in which multiple strands of fibrous basic magnesium sulfate are partially joined to each other to form a flabellate shape, and the flabellate basic magnesium sulfate has a mean particle length of from 2 to 100 μm, a mean particle width of from 1 to 40 μm, and a mean aspect ratio in a range from 1 to 100.

2. A basic magnesium sulfate powder comprising a surface at least partially coated with an inorganic phosphorus compound, wherein the basic magnesium sulfate powder has a phosphorus content of from 0.002 to 3.0 mass %, a mean fiber length of from 2 to 100 μm, a mean fiber diameter of from 0.1 to 2 μm, and a mean aspect ratio in a range from 3 to 1000, wherein the inorganic phosphorus compound is selected from the group consisting of magnesium dihydrogen phosphate, ammonium phosphate, ammonium phosphate trihydrate, potassium dihydrogen phosphate, calcium dihydrogen phosphate, sodium dihydrogen phosphate, sodium dihydrogen phosphate dihydrate, potassium phosphate, trisodium phosphate, ammonium hydrogen phosphate, dipotassium phosphate, ammonium dihydrogen phosphate, tricalcium phosphate, calcium hydrogen phosphate, magnesium hydrogen phosphate, magnesium phosphate, barium hydrogen phosphate, lithium phosphate, disodium hydrogen phosphate 12-water, and sodium hydrogen phosphate.

3. The basic magnesium sulfate powder according to claim 2, wherein the basic magnesium sulfate is flabellate basic magnesium sulfate.

4. A method for manufacturing the basic magnesium sulfate powder according to claim 2, whose surface is at least partially coated with the inorganic phosphorus compound, the method comprising: wet-mixing basic magnesium sulfate and inorganic phosphorus compound; and next performing filtration, washing, and drying.

5. A resin composition comprising: a thermoplastic resin; and the basic magnesium sulfate powder according to claim 2 in an amount of 1 to 40 mass % of the thermoplastic resin.

6. A masterbatch pellet comprising: a thermoplastic resin; and the basic magnesium sulfate powder according to claim 2 in an amount of 41 to 75 mass of the thermoplastic resin.

7. A molded body comprising a molded product of the resin composition according to claim 5.

8. The basic magnesium sulfate power according to claim 2, wherein the inorganic phosphorus compound is selected from the group consisting of magnesium dihydrogen phosphate, ammonium phosphate trihydrate, potassium dihydrogen phosphate, sodium dihydrogen phosphate dihydrate, and disodium hydrogen phosphate 12-water.

9. A method for manufacturing the basic magnesium sulfate powder according to claim 1, whose surface is at least partially coated with the inorganic phosphorus compound, the method comprising: wet-mixing basic magnesium sulfate and inorganic phosphorus compound; and next performing filtration.

10. A resin composition comprising: a thermoplastic resin; and the basic magnesium sulfate powder according to claim 1 in an amount of 1 to 40 mass % of the thermoplastic resin.

11. A masterbatch pellet comprising: a thermoplastic resin; and the basic magnesium sulfate powder according to claim 1 in an amount of 41 to 75 mass of the thermoplastic resin.

12. A molded body comprising a molded product of the resin composition according to claim 10.

13. The basic magnesium sulfate powder according to claim 1, wherein the inorganic phosphorus compound is selected from the group consisting of phosphoric acid, magnesium dihydrogen phosphate, ammonium phosphate, potassium dihydrogen phosphate, calcium dihydrogen phosphate, sodium dihydrogen phosphate, potassium phosphate, trisodium phosphate, ammonium hydrogen phosphate, dipotassium phosphate, ammonium dihydrogen phosphate, tricalcium phosphate, calcium hydrogen phosphate, magnesium hydrogen phosphate, magnesium phosphate, barium hydrogen phosphate, lithium phosphate, and sodium hydrogen phosphate.

14. The basic magnesium sulfate powder according to claim 1, wherein the inorganic phosphorus compound is selected from the group consisting of phosphoric acid, magnesium dihydrogen phosphate, ammonium phosphate trihydrate, potassium dihydrogen phosphate, sodium dihydrogen phosphate dihydrate, and disodium hydrogen phosphate 12-water.

15. A method of reducing generation of blisters on a surface of an automobile exterior member, which comprises:
   kneading a thermoplastic resin and a basic magnesium sulfate powder comprising a surface at least partially coated with an inorganic phosphorus compound to form a resin composition; and
   producing the automobile exterior member of the resin composition.

16. The method according to claim 15, wherein the thermoplastic resin is polypropylene.

* * * * *